(12) United States Patent
Mukai et al.

(10) Patent No.: US 11,084,725 B2
(45) Date of Patent: Aug. 10, 2021

(54) DRAWN CARBON NANOTUBE YARN AND PRODUCTION METHOD THEREFOR

(71) Applicant: NATIONAL INSTITUTE OF ADVANCED INDUSTRIAL SCIENCE AND TECHNOLOGY, Tokyo (JP)

(72) Inventors: Ken Mukai, Ikeda (JP); Kinji Asaka, Ikeda (JP); Takeshi Saito, Tsukuba (JP); Motoo Yumura, Tsukuba (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 0 days.

(21) Appl. No.: 16/352,553

(22) Filed: Mar. 13, 2019

(65) Prior Publication Data
US 2019/0210878 A1   Jul. 11, 2019

Related U.S. Application Data

(62) Division of application No. 14/891,920, filed as application No. PCT/JP2014/062981 on May 15, 2014, now Pat. No. 10,273,157.

(30) Foreign Application Priority Data

May 17, 2013  (JP) .................................. 2013-104913
Mar. 20, 2014  (JP) .................................. 2014-058722

(51) Int. Cl.
*C01B 32/168*    (2017.01)
*D02G 3/16*     (2006.01)
(Continued)

(52) U.S. Cl.
CPC .......... *C01B 32/168* (2017.08); *C01B 32/174* (2017.08); *D01D 5/06* (2013.01);
(Continued)

(58) Field of Classification Search
CPC . C01B 32/158; C01B 32/169; C01B 32/0226; C01B 2202/02; C01B 2202/22; D02G 3/16; D10B 2101/122
See application file for complete search history.

(56) References Cited

U.S. PATENT DOCUMENTS

2009/0075545 A1   3/2009   Lashmore et al.
2013/0251619 A1   9/2013   Rikihisa et al.
2013/0321662 A1  12/2013   Ishikawa et al.

FOREIGN PATENT DOCUMENTS

CN       102078864 A   6/2011
JP     2005-502792 A   1/2005
(Continued)

OTHER PUBLICATIONS

Jee, Min Ho, et al. "Influences of tensile drawing on structures, mechanical, and electrical properties of wet-spun multi-walled carbon nanotube composite fiber." Macromolecular research 20.6 (2012): 650-657.*

(Continued)

*Primary Examiner* — Richard M Rump
(74) *Attorney, Agent, or Firm* — Leydig, Voit & Mayer, Ltd.

(57) ABSTRACT

An object of the present invention is to provide a CNT yarn having excellent conductivity and strength, and a method for producing the same. The present invention provides a drawn yarn comprising carbon nanotubes and having a drawing rate of 10 to 50%.

5 Claims, 2 Drawing Sheets

(51) Int. Cl.
   *D01D 5/06* (2006.01)
   *D01D 5/12* (2006.01)
   *D01F 9/12* (2006.01)
   *C01B 32/174* (2017.01)

(52) U.S. Cl.
   CPC ............... *D01D 5/12* (2013.01); *D01F 9/12* (2013.01); *D02G 3/16* (2013.01); *C01B 2202/02* (2013.01); *C01B 2202/22* (2013.01); *D10B 2101/122* (2013.01)

(56) References Cited

FOREIGN PATENT DOCUMENTS

| | | |
|---|---|---|
| JP | 2005-161599 A | 6/2005 |
| JP | 2007-119997 A | 5/2007 |
| JP | 2010-065339 A | 3/2010 |
| JP | 2010-168679 A | 8/2010 |
| JP | 2010-216018 A | 9/2010 |
| JP | 2010-534772 A | 11/2010 |
| JP | 2012-126635 A | 7/2012 |
| JP | 2012-127043 A | 7/2012 |
| WO | WO 2003/004740 A1 | 1/2003 |
| WO | WO 2003/004741 A1 | 1/2003 |
| WO | WO 2006/137893 A2 | 12/2006 |
| WO | WO 2009/029341 A2 | 3/2009 |
| WO | WO 2013/034672 A2 | 3/2013 |

OTHER PUBLICATIONS

Hiroya Abe, Zhenquan Tan, Akira Kondo, Makio Naito; Direct Filament Formation of Biological Carbon Nanotube Suspensions. Additional Conferences (Device Packaging, HiTEC, HiTEN, and CICMT) Sep. 1, 2012; 2012 (CICMT): 000132-000135. doi: https://doi.org/10.4071/CICMT-2012-TP31.*

Badaire et al., "Correlation of properties with preferred orientation in coagulated and stretch-aligned single-wall carbon nanotubes," *Journal of Applied Physics*, 96(12): 7509-7513 (2004).

Behabtu, et al., "Carbon nanotube-based neat fibers," *nanotoday*, 3(5-6): 24-34 (2008).

Inoue et al., "Anisotropic carbon nanotube papers fabricated from multiwalled carbon nanotube webs", *Carbon*, 49: 2437-2443 (2011).

Vigolo et al., "Macroscopic Fibers and Ribbons of Oriented Carbon Nanotubes," *Science*, 290: 1331-1334 (Nov. 17, 2000).

Chinese Patent Office, The Second Office Action in Chinese Patent Application No. 201480026641.2 (dated Apr. 24, 2017).

Japanese Patent Office, International Search Report in International Patent Application No. PCT/JP2014/062981 (dated Jul. 15, 2014).

* cited by examiner (A)

(B)

DRAWN CARBON NANOTUBE YARN AND PRODUCTION METHOD THEREFOR

CROSS-REFERENCE TO RELATED APPLICATION

This patent application is a divisional of copending U.S. patent application Ser. No. 14/891,920, filed on Nov. 17, 2015, which is the U.S. national phase of International Patent Application No. PCT/JP2014/062981, filed May 15, 2014, which claims the benefit of Japanese Patent Application No. 2013-104913 filed on May 17, 2013, and Japanese Patent Application No. 2014-058722 filed on Mar. 20, 2014, the disclosures of which are incorporated by reference in their entireties herein.

TECHNICAL FIELD

The present invention relates to a drawn carbon nanotube yarn and a method for producing the same.

BACKGROUND ART

Conductive yarn comprising carbon nanotubes (CNTs) is expected to obtain excellent conductivity and mechanical strength; therefore, various methods for producing the yarn have been proposed.

For example, in NPL 1, CNTs are drawn from CNT forests, and twisted to produce conductive CNT yarn. However, this method requires the use of multi-walled carbon nanotubes (MWCNTs) and CNT forests.

In NPL 2, a CNT dispersion is poured into a condensed liquid containing polyvinyl alcohol to produce CNT yarn. However, there is a drawback in that the obtained CNT yarn has low conductivity.

In PTL 1, a dispersion containing CNTs and a thickener is used to produce CNT yarn. However, it is difficult to completely remove the thickener.

In PTL 2 and PTL 3, the conductivity of CNT yarn is improved by not adding other polymers. However, CNT yarn having even higher conductivity has been desired.

CITATION LIST

Patent Literature

PTL 1: JP2010-168679A
PTL 2: JP2012-126635A
PTL 3: JP2012-127043A

Non-Patent Literature

NPL 1: Inoue et al., Carbon, 49 (2011), 2437-2443
NPL 2: Vigolo et al., Science, 290 (2000), 1331-1334

SUMMARY OF INVENTION

Technical Problem

An object of the present invention is to provide a CNT yarn having excellent conductivity and strength, and a method for producing the same.

Solution to Problem

The present invention provides the following drawn carbon nanotube-containing yarn, and method for producing the same.

Item 1. A drawn yarn comprising carbon nanotubes and having a drawing rate of 10 to 50%.

Item 2. A drawn yarn comprising carbon nanotubes and having a ratio Ih/Iv of 3.5 or more in polarized Raman measurement, wherein Ih represents the G band Raman intensity measured by placing the drawn yarn horizontally to polarized laser light, and Iv represents the G band Raman intensity measured by placing the drawn yarn vertically to the polarized laser light.

Item 3. The drawn yarn according to Item 1 or 2, which has a conductivity of 2,500 to 600,000 S/cm.

Item 4. The drawn yarn according to any one of Items 1 to 3, which has a Young's modulus of 10 to 640 GPa.

Item 5. The drawn yarn according to any one of Items 1 to 4, which has a breaking strength of 150 to 30,000 MPa.

Item 6. The drawn yarn according to any one of Items 1 to 5, wherein the carbon nanotubes are single wall carbon nanotubes (SWNTs).

Item 7. The drawn yarn according to any one of Items 1 to 6, wherein the carbon nanotubes are single wall carbon nanotubes (SWNTs) obtained by an enhanced direct injective pyrolytic synthesis (eDIPS) method.

Item 8. A method for producing the drawn yarn according to any one of Items 1 to 7, the method comprising:
 discharging a dispersion containing carbon nanotubes (CNTs) and a surfactant into a coagulation bath containing an organic solvent;
 immersing the discharged CNT yarn in water; and
 drawing the wet CNT yarn.

Item 9. A method for producing the drawn yarn according to any one of Items 1 to 7, the method comprising:
 discharging a dispersion containing carbon nanotubes (CNTs) and a surfactant into a coagulation bath;
 immersing the discharged CNT yarn in water; and
 drawing the wet CNT yarn;
 wherein the dispersion and coagulation bath both have a pH of 3 to 11;
 the dispersion and coagulation bath contain water as their solvent; and
 the dispersion or coagulation bath contains one or more salts.

Advantageous Effects of Invention

According to the present invention, a drawn carbon nanotube yarn having excellent conductivity and strength can be obtained.

DESCRIPTION OF EMBODIMENTS

Figure 1:
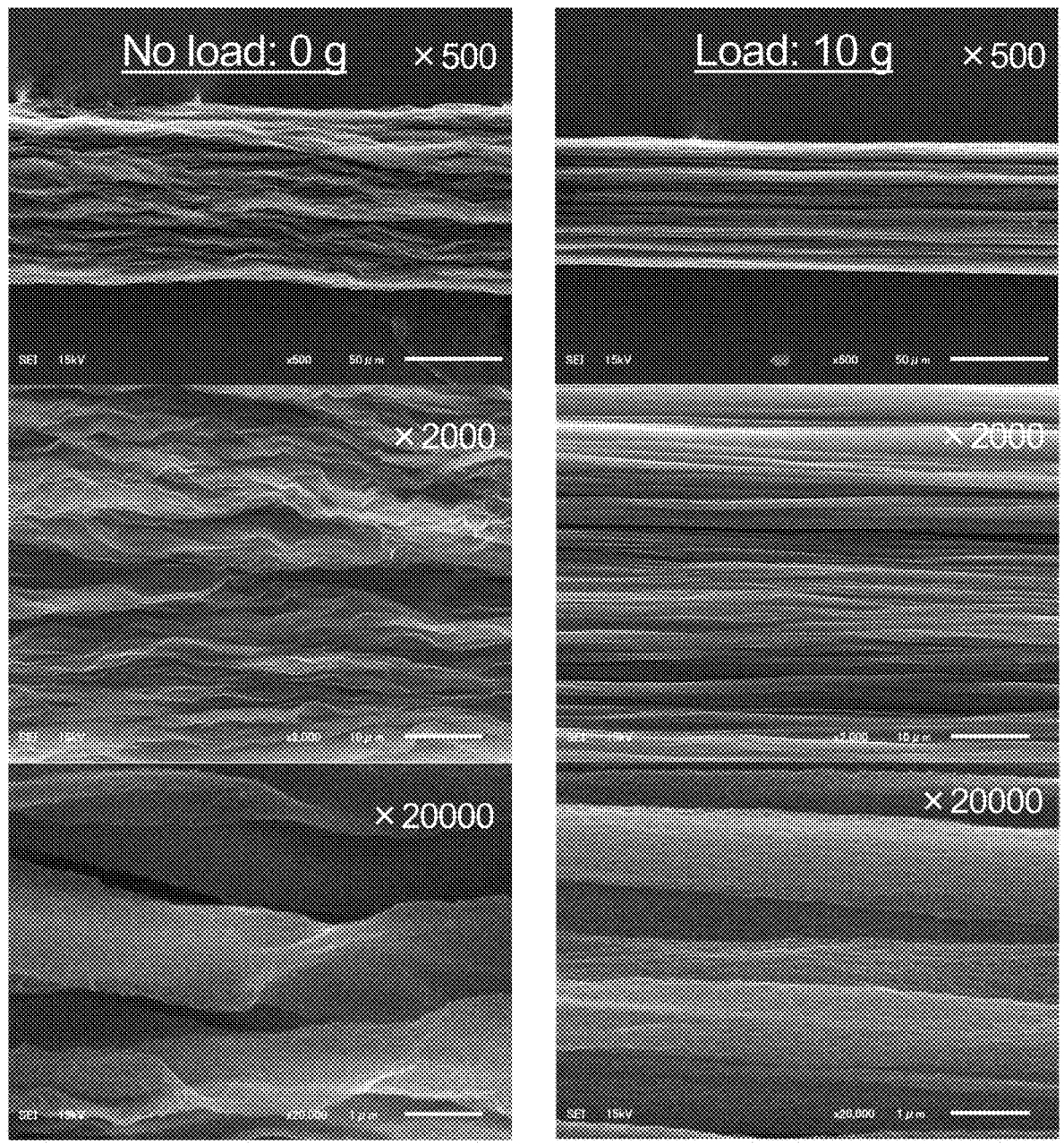
FIG. 1 shows electron micrographs of the CNT yarn of the present invention before drawing (no load: 0 g) and after drawing (load: 10 g). The electron micrographs show the CNT yarn before drawing (left column) and the CNT yarn after drawing with a magnification of 200 times (bar: 50 μm), 2,000 times (bar: 10 μm), and 20,000 times (bar: 1 μm).

The carbon nanotube used in the present invention is a carbon-based material comprising a cylindrically rolled graphene sheet. Various carbon nanotubes are known. For example, carbon nanotubes are roughly divided into single wall carbon nanotubes (SWNTs) and multi wall carbon nanotubes (MWNTs) based on the number of peripheral walls. Further, carbon nanotubes are classified into chiral (helical) nanotubes, zigzag nanotubes, and armchair nanotubes based on the structural difference of graphene sheets. In the present invention, any type of carbon nanotubes can be used, as long as they are so-called carbon nanotubes. In general, single wall carbon nanotubes having a high aspect ratio and large intermolecular force can easily form CNT yarn. Examples thereof include carbon nanotubes having an aspect ratio of $10^2$ or more, and preferably $5 \times 10^2$ or more. The upper limit of the length of the carbon nanotube is not particularly limited, and is, for example, about 10 µm. The carbon nanotubes are preferably single wall nanotubes (SWNTs), more preferably carbon nanotubes produced by a direct injective pyrolytic synthesis (DIPS) method or an enhanced direct injective pyrolytic synthesis (eDIPS) method; and particularly preferably carbon nanotubes produced by the eDIPS method.

The DIPS method is described, for example, in the following document: Saito et al., J. Phys. Chem. B, 110 (2006), 5849-5853. The eDIPS method is described, for example, in the following document: Saito et al., J. Nanosci. Nanotechnol., 8 (2008) 6153-6157.

The carbon nanotubes are dispersed in an aqueous solution of a surfactant. The surfactant may be a nonionic surfactant, an anionic surfactant, a cationic surfactant, or an amphoteric surfactant.

Examples of nonionic surfactants include polyoxyethylene alkyl ether, polyoxyethylene alkyl phenyl ether, sorbitan fatty acid ester, sucrose fatty acid ester, polyoxyethylene sorbitan fatty acid ester, polyoxyethylene sorbitol fatty acid ester, glycerol fatty acid ester, polyoxyethylene fatty acid ester, polyoxyethylene-polyoxypropylene block copolymer, and the like. Specific examples thereof include poly(oxyethylene)octylphenyl ether (e.g., Triton (registered trademark) X-100), polyoxyethylene sorbitan monolaurate (e.g., Tween (registered trademark) 20), and the like.

Examples of anionic surfactants include alkylbenzene sulfonates (e.g., sodium dodecylbenzenesulfonate), alkyl alcohol sulfates (e.g., sodium dodecyl sulfate), sodium alkyl diphenyl ether disulfonate, sodium polyoxyethylene alkyl ether sulfate, sodium dialkyl sulfosuccinate, sodium alkyl allyl sulfosuccinate, sodium N-lauroyl sarcosine, sodium polyoxyethylene alkyl phenyl ether sulfate, sodium (meth) acryloyl polyoxyalkylene sulfate, alkyl alcohol phosphate, and bile salts (e.g., sodium cholate and sodium deoxycholate). Bile salts, such as sodium cholate, are preferably used.

Examples of cationic surfactants include tetraalkylammonium halides, alkyl pyridinium halides, alkyl imidazoline halides, and the like.

Examples of amphoteric surfactants include alkyl betaine, alkyl imidazolinium betaine, lecithin, and the like.

The amount of the carbon nanotubes in the dispersion is about 5 to 1,500 mg, and preferably about 10 to 1,200 mg, based on 100 ml of the solvent. The amount of the carbon nanotubes in the dispersion may be about 100 to 1,500 mg, and preferably about 150 to 1,200 mg, based on 100 ml of the solvent.

The amount of the surfactant in the dispersion is about 0.05 to 5 mass %, and preferably about 0.1 to 2 mass %. The amount of the surfactant in the dispersion may be about 0.2 to 5 mass %, and preferably about 0.5 to 2 mass %.

The dispersion of the present invention is discharged into a coagulation bath from a syringe, spinneret, or the like in a spinning step, thereby forming a spun raw yarn. The spun raw yarn is immersed in water, and then subjected to a drawing step, thereby obtaining a drawn yarn. The diameter of the syringe, spinneret, or the like for discharging the dispersion is about 10 to 2,000 µm, and preferably about 20 to 1,500 µm. This diameter may be about 50 to 2,000 µm, and preferably about 100 to 1,500 µm. The diameter of the syringe etc. can be controlled to thereby adjust the diameter of the spun raw yarn as well as the diameter of the drawn yarn.

In one embodiment of the present invention, the solvent of the coagulation bath is an organic solvent. The organic solvent of the coagulation bath is preferably an organic solvent miscible with water. Examples thereof include lower alcohols, such as ethanol, methanol, propanol, and isopropanol; ketones, such as acetone, methyl ethyl ketone, and 4-methyl-2-pentanone (MIBK); ethers, such as tetrahydrofuran and dioxane; amides, such as DMF, acetamide, formamide, dimethylacetamide, and N-methylpyrrolidone; glycols, such as ethylene glycol, propylene glycol, diethylene glycol, and dipropylene glycol; alkylene glycol monoalkyl ethers, such as ethylene glycol monomethyl ether and ethylene glycol monoethyl ether; dimethylsulfoxide, acetonitrile, and the like. The solvent of the coagulation bath is preferably a water-containing organic solvent. The temperature of the coagulation bath may be about 5 to 50° C., and is preferably about room temperature. The discharged CNT yarn may be immediately subjected to the subsequent water immersion step, or may be maintained in the coagulation bath for 1 minute or more, e.g., 5 minutes or more.

In another embodiment of the present invention, water may be used as the solvent for both the dispersion and coagulation bath. In that case, one or more salts are added to one or both of the dispersion and coagulation bath. When no salts are contained in the dispersion or coagulation bath, a spun raw yarn cannot be obtained. Both inorganic salts and organic salts may be used; however, inorganic salts are preferred. Water-soluble salts are used. Preferred salts are alkali metal salts and alkaline earth metal salts; more preferred salts are sodium salts, potassium salts, lithium salts, calcium salts, magnesium salts, barium salts, and strontium salts; and even more preferred salts are sodium salts, calcium salts, and magnesium salts. Examples of anions of salts include chlorine ions, fluorine ions, bromine ions, iodine ions, sulfate ions, sulfite ions, phosphate ions, nitrate ions, nitrite ions, methanesulfonate ions, benzenesulfonate ions, toluenesulfonate ions, citrate ions, oxalate ions, malate ions, tartrate ions, maleate ions, fumarate ions, acetate ions, and the like.

Examples of preferred salts include sodium chloride, potassium chloride, lithium chloride, calcium chloride, magnesium chloride, sodium bromide, potassium bromide, calcium bromide, magnesium bromide, sodium sulfate, potassium sulfate, sodium nitrate, potassium nitrate, calcium nitrate, magnesium nitrate, sodium phosphate, disodium monohydrogen phosphate, monosodium dihydrogen phosphate, sodium phosphate, disodium monohydrogen phosphate, monosodium dihydrogen phosphate, potassium phosphate, dipotassium monohydrogen phosphate, monopotassium dihydrogen phosphate, potassium phosphate, dipotassium monohydrogen phosphate, monopotassium dihydrogen phosphate, and the like.

The salt concentration of the dispersion is about 0 to 25 mass %, and preferably about 0 to 20 mass %. The salt concentration of the coagulation bath is about 0 to 40 mass %, and preferably about 0 to 35 mass %. Salts are used singly or in a combination of two or more, and are dissolved in the dispersion and/or coagulation bath. Because one or more salts are contained in the coagulation bath or dispersion, the salts are also contained in the coagulation bath into which the dispersion is discharged. The salt concentration of the coagulation bath into which the dispersion is discharged is about 0.5 to 40 mass %, and preferably about 1 to 35 mass %. Because one or more salts may be contained only in the dispersion or coagulating liquid, the lower limit of the salt concentration of each of the dispersion and coagulating liquid is 0 mass %; however, the lower limit of the salt concentration of the dispersion/coagulating liquid containing one or more salts is about 0.5 mass %, and preferably about 1 mass %. The upper limit is about 40 mass %, and preferably about 35 mass %.

The CNT yarn obtained by discharging the dispersion into the coagulation bath is further immersed in water to sufficiently remove the surfactant, or the surfactant and salts, and to make the CNT yarn wet. The temperature of water in the immersion step is about 5 to 50° C., and preferably about room temperature. The immersion time is 2 hours or more, and preferably 24 hours or more. The water immersion step removes the surfactant, or the surfactant and salts. Thus, the CNT yarn is obtained.

The wet CNT yarn is subjected to the subsequent drawing step. Drawing is performed while applying a predetermined load to the wet CNT yarn. The predetermined load is 10 to 60% load of breaking strength, and preferably 12 to 50% load of breaking strength. When the load is overly high, the CNT yarn may be broken, whereas when the load is overly low, sufficient drawing is not performed.

The drawing rate is about 5 to 70%, and preferably about 10 to 50%.

In the present specification, the drawing rate is defined by the following formula:

Drawing rate (%)=[{(length of yarn after drawing)−(length of yarn before drawing)}/(length of yarn before drawing)]×100

After drawing, the yarn can be dried, if necessary, thereby obtaining a drawn CNT yarn.

The drawn CNT yarn of the present invention has the following physical properties:

Conductivity: about 1,000 to 1,000,000 S/cm, preferably about 2,500 to 600,000 S/cm;

Young's modulus: about 0.5 to 1,000 GPa, preferably about 10 to 640 GPa;

Breaking strength: about 50 to 50,000 MPa, preferably about 150 to 30,000 MPa.

These physical properties can be measured by a method known to a person skilled in the art. For example, the Young's modulus and breaking strength can be measured according to JIS L 1013. Specifically, stress-strain measurement is performed; then, the Young's modulus is determined from the initial inclination of the curve, and the breaking strength is determined from the stress of the cutting position. The conductivity is determined from the inclination in current-voltage measurement performed by a four-terminal method.

The drawn CNT yarn of the present invention further has the following physical properties:

In polarized Raman measurement, the ratio Ih/Iv of the G band Raman intensity Ih measured by placing the drawn yarn horizontally to polarized laser light, to the G band Raman intensity Iv measured by placing the drawn yarn vertically to the polarized laser light, is 3.0 or more, preferably 3.5 or more, and more preferably 4 or more.

The G band in the Raman spectrum is a vibration mode observed at around 1,590 cm$^{-1}$, and is considered to be the same type of vibration mode as the Raman active mode of graphite.

Examples

The present invention is described in more detail below using Examples and Comparative Examples.

Example 1 and Comparative Example 1

20 mg of single-walled carbon nanotubes produced by the eDIPS method (hereinafter referred to as "eDIPS-CNT") and 120 mg of sodium cholate (SC) were added to 9.86 g of water, and the mixture was stirred with a sonic stirrer at 35° C. for 30 minutes. Then, the resulting product was treated with an ultrasonic homogenizer, thereby obtaining an eDIPS-CNT dispersion.

The obtained dispersion was poured into an isopropanol (IPA) solution from an injection nozzle (inner diameter: 0.9 mm).

After being left in the IPA solution for 30 minutes, the eDIPS-CNT yarn was removed from the IPA solution, and then immersed in water for 1 day or more.

The eDIPS-CNT yarn removed from water was drawn in a wet state by fixing one end of the yarn with a jig, and applying a load of 0 g (undrawn; Comparative Example 1), 5 g, or 10 g to the other end (Example 1). The drawing rate, conductivity, Young's modulus, breaking strength, and elongation at break of the obtained drawn yarn were measured. Table 1 shows the results. The breaking strength of the obtained drawn yarn is at least 2 times the breaking strength of the undrawn yarn. Moreover, FIG. 1 shows electron micrographs of the eDIPS yarn before drawing (no load: 0 g) and after drawing (load: 10 g).

TABLE 1

| Load during drawing | Drawing rate (%) | Conductivity (S/cm) | Young's modulus (GPa) | Breaking strength (MPa) | Elongation at break (%) |
|---|---|---|---|---|---|
| 0 g | 0 | 2410 | 6.88 | 114.4 | 16.1 |
| 5 g | 12-14 | 5707 | 17.08 | 282.3 | 14.1 |
| 10 g | 15-17 | 7345 | 45.15 | 469.4 | 4.43 |

The results of Table 1 revealed that the conductivity, Young's modulus, and breaking strength were dramatically improved by drawing.

The electron micrographs of FIG. 1 showed that the eDIPS yarn to which no load was applied during drawing (load: 0 g) had many gaps in the CNT yarn (see the micrograph at low magnification), and that the CNTs were not oriented (see the micrograph at high magnification). In contrast, the gaps in the eDIPS yarn to which 10 g load was applied were filled due to the drawing effect (see the micrograph at low magnification), and the CNTs were oriented (see the micrograph at high magnification). The results of these electron micrographs indicate that the density of the CNT yarn was increased due to the drawing effect. As a result, the mechanical strength and conductivity were presumably significantly improved, as shown in the results of Table 1.

Example 2 and Comparative Example 2

An eDIPS-CNT dispersion obtained by the same dispersion step as in Example 1 was poured into an isopropanol (IPA) solution from an injection nozzle (inner diameter: 0.51 mm).

After being left in the IPA solution for 30 minutes, the eDIPS-CNT yarn was removed from the IPA solution, and then immersed in water for 1 day or more.

Figure 2:
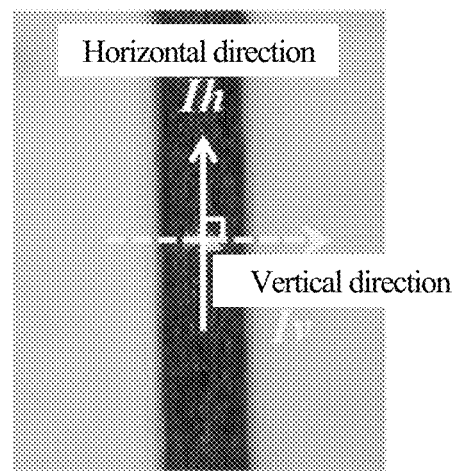
FIG. 2 shows the results of polarized Raman measurement. (A) schematically shows the direction of polarized laser light applied to a sample. (B) shows the spectrum waveform and Raman intensity ratio of a drawn CNT yarn, an undrawn CNT yarn, and a CNT film obtained in the polarized Raman measurement.
Figure 2:
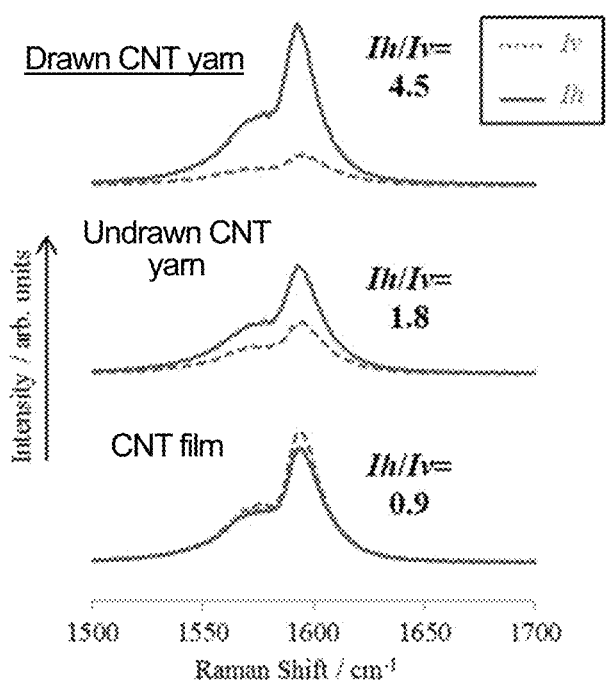

The eDIPS-CNT yarn removed from water was drawn in a wet state by fixing one end of the yarn with a jig, and applying a load of 3 g to the other end, thereby producing a drawn yarn. An undrawn yarn was produced by not drawing the eDIPS-CNT yarn. Further, a CNT film was produced by casting the carbon nanotube (CNT) dispersion of Example 1. These yarns and film were subjected to polarized Raman measurement (model NRS-3100, produced by JASCO Corporation; excitation wavelength: 532 nm). FIG. 2 shows the results. FIG. 2A shows the direction of polarized laser light applied to each sample. FIG. 2B shows the Raman spectrum waveform and the Raman intensity ratio Ih/Iv of the G band measured by placing each sample horizontally and vertically to the polarized laser light. As is clear from FIG. 2B, the Ih/Iv value of the CNT film is almost 1, which indicates that the CNTs in the film are not aligned and not oriented. In contrast, the Ih/Iv value of the drawn yarn (Example 2) is 4.5, and the Ih/Iv value of the undrawn yarn (Comparative Example 2) is 1.8. These values are clearly different from the value of the non-oriented CNT film. This indicates that the CNTs unidirectionally aligned to some extent by the yarn-producing steps other than the drawing step were further significantly oriented in the drawing direction due to the influence of tension applied by the drawing step.

Moreover, Table 2 shows the conductivity, Young's modulus, and tensile strength. It is found that the drawn yarn shows the largest values.

TABLE 2

Properties of CNT film, undrawn CNT yarn, and drawn CNT yarn

|  | Young's modulus (GPa) | Breaking strength (MPa) | Conductivity (S/cm) |
| --- | --- | --- | --- |
| CNT film | 13.7 | 146 | 1978 |
| Undrawn CNT yarn | 15.2 | 315 | 2473 |
| Drawn CNT yarn | 69.5 | 687 | 12215 |

The invention claimed is:

1. A drawn yarn comprising single wall carbon nanotubes and sodium cholate, having a drawing rate of 10% to 50%, and having a breaking strength which is at least 2 times the breaking strength of the undrawn yarn, wherein the drawn yarn is formed by a process in which a dispersion comprising carbon nanotubes and sodium cholate is discharged into a coagulation bath comprising an organic solvent.

2. The drawn yarn according to claim 1, wherein the drawn yarn has a breaking strength of 150 to 30,000 MPa.

3. The drawn yarn according to claim 1, wherein the drawn yarn has a ratio Ih/Iv of 3.5 or more in polarized Raman measurement, and wherein Ih represents the G band Raman intensity measured by placing the drawn yarn horizontally to polarized laser light, and Iv represents the G band Raman intensity measured by placing the drawn yarn vertically to the polarized laser light.

4. The drawn yarn according to claim 1, wherein the drawn yarn has an electrical conductivity of 2,500 to 600,000 S/cm.

5. The drawn yarn according to claim 1, wherein the drawn yarn has a Young's modulus of 10 to 640 GPa.

* * * * *